United States Patent
Flood et al.

(10) Patent No.: US 11,004,279 B2
(45) Date of Patent: May 11, 2021

(54) CONTROLLING FORESTRY MACHINES ACROSS A JOBSITE

(71) Applicant: Deere & Company, Moline, IL (US)

(72) Inventors: Matthew J. Flood, Dubuque, IA (US); Alek D. Jerauld, Dubuque, IA (US); Robert A. Hamilton, Dubuque, IA (US)

(73) Assignee: Deere & Company, Moline, IL (US)

( * ) Notice: Subject to any disclaimer, the term of this patent is extended or adjusted under 35 U.S.C. 154(b) by 338 days.

(21) Appl. No.: 15/960,062

(22) Filed: Apr. 23, 2018

(65) Prior Publication Data
US 2019/0325669 A1    Oct. 24, 2019

(51) Int. Cl.
*G07C 5/02* (2006.01)
*G06Q 10/06* (2012.01)
*A01G 23/00* (2006.01)

(52) U.S. Cl.
CPC ......... *G07C 5/02* (2013.01); *G06Q 10/06395* (2013.01); *A01G 23/00* (2013.01)

(58) Field of Classification Search
CPC ..... G07C 5/02; G06Q 10/06395; A01G 23/00
See application file for complete search history.

(56) References Cited

U.S. PATENT DOCUMENTS

| 2008/0059411 | A1 | 3/2008 | Greiner et al. | |
| 2010/0042297 | A1* | 2/2010 | Foster | H04W 4/08 701/50 |
| 2010/0274452 | A1* | 10/2010 | Ringwald | A01B 69/008 701/50 |
| 2011/0301995 | A1* | 12/2011 | Fukuda | G06Q 10/06311 705/7.16 |
| 2013/0046525 | A1* | 2/2013 | Ali | G05D 1/0221 703/6 |
| 2015/0323913 | A1 | 11/2015 | Gilmore et al. | |
| 2016/0300175 | A1* | 10/2016 | Talmaki | G06Q 10/06315 |
| 2017/0168751 | A1* | 6/2017 | Stevens | G06F 16/24568 |
| 2018/0216459 | A1* | 8/2018 | Heikkila | E21C 41/26 |

FOREIGN PATENT DOCUMENTS

WO    WO2011064453 A1    6/2011

OTHER PUBLICATIONS

Finland Office Action issued in counterpart application No. 20195297 dated Aug. 19, 2020 (13 pages).

* cited by examiner

*Primary Examiner* — Hussein Elchanti
(74) *Attorney, Agent, or Firm* — Joseph R. Kelly; Kelly, Holt & Christenson, PLLC

(57) ABSTRACT

A machine output detection and control system includes machine metric logic that detects a plurality of quantity metrics, each quantity metric corresponding to sensor information associated with at least one mobile machine in a plurality of different mobile machines. The system also includes normalization logic that aggregates the plurality of different quantity metrics to generate, for each mobile machine, a normalized production unit that is normalized across the plurality of different mobile machines. Dependency logic correlates the normalized production unit, for each mobile machine, to a machine dependency that identifies an order in which the plurality of different mobile machines operate at a jobsite. Further, action signal logic generates an action signal, based on the correlation.

20 Claims, 11 Drawing Sheets

CONTROLLING FORESTRY MACHINES ACROSS A JOBSITE

FIELD OF THE DESCRIPTION

The present description generally relates to the use of a wide variety of different vehicles in forestry operations. More specifically, the present description relates to the use of computing systems in improving activity measurement for performance tracking and control applications at a worksite.

BACKGROUND

There are a wide variety of different types of equipment, such as forestry equipment, construction equipment, and agricultural equipment. These types of equipment are often operated by an operator and have sensors that generate information during an operation. These types of equipment can often communicate the sensor information to other machines. However, this sensor information is often used within the parameters of the sensing machine. In other words, the sensor information is machine-specific.

Forestry equipment can include a wide variety of machines such as harvesters, skidders, feller bunchers, forwarders, and swing machines, among others. Forestry equipment can be operated by an operator and have many different mechanisms that are controlled by the operator. The equipment may have multiple different mechanical, electrical, hydraulic, pneumatic, electromechanical (and other) subsystems, some or all of which can be controlled, at least to some extent, by the operator. Some or all of these subsystems may communicate information that is obtained from sensors on the machine (and from other inputs). For instance, a feller buncher might cut stems and provide sensed information about the stems.

Current systems may experience difficulty in utilizing information that is typically expressed according to the parameters of a sensing machine. That is, current systems may experience difficulty in utilizing machine-specific information to control a wide variety of different machines to improve performance of the machines and increase productivity measures across an entire forestry operation.

The discussion above is merely provided for general background information and is not intended to be used as an aid in determining the scope of the claimed subject matter.

SUMMARY

A machine output detection and control system includes machine metric logic that detects a plurality of quantity metrics, each quantity metric corresponding to sensor information associated with at least one mobile machine in a plurality of different mobile machines. The system also includes normalization logic that aggregates the plurality of different quantity metrics to generate, for each mobile machine, a normalized production unit that is normalized across the plurality of different mobile machines. Dependency logic correlates the normalized production unit, for each mobile machine, to a machine dependency that identifies an order in which the plurality of different mobile machines operate at a jobsite. Further, action signal logic generates an action signal, based on the correlation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
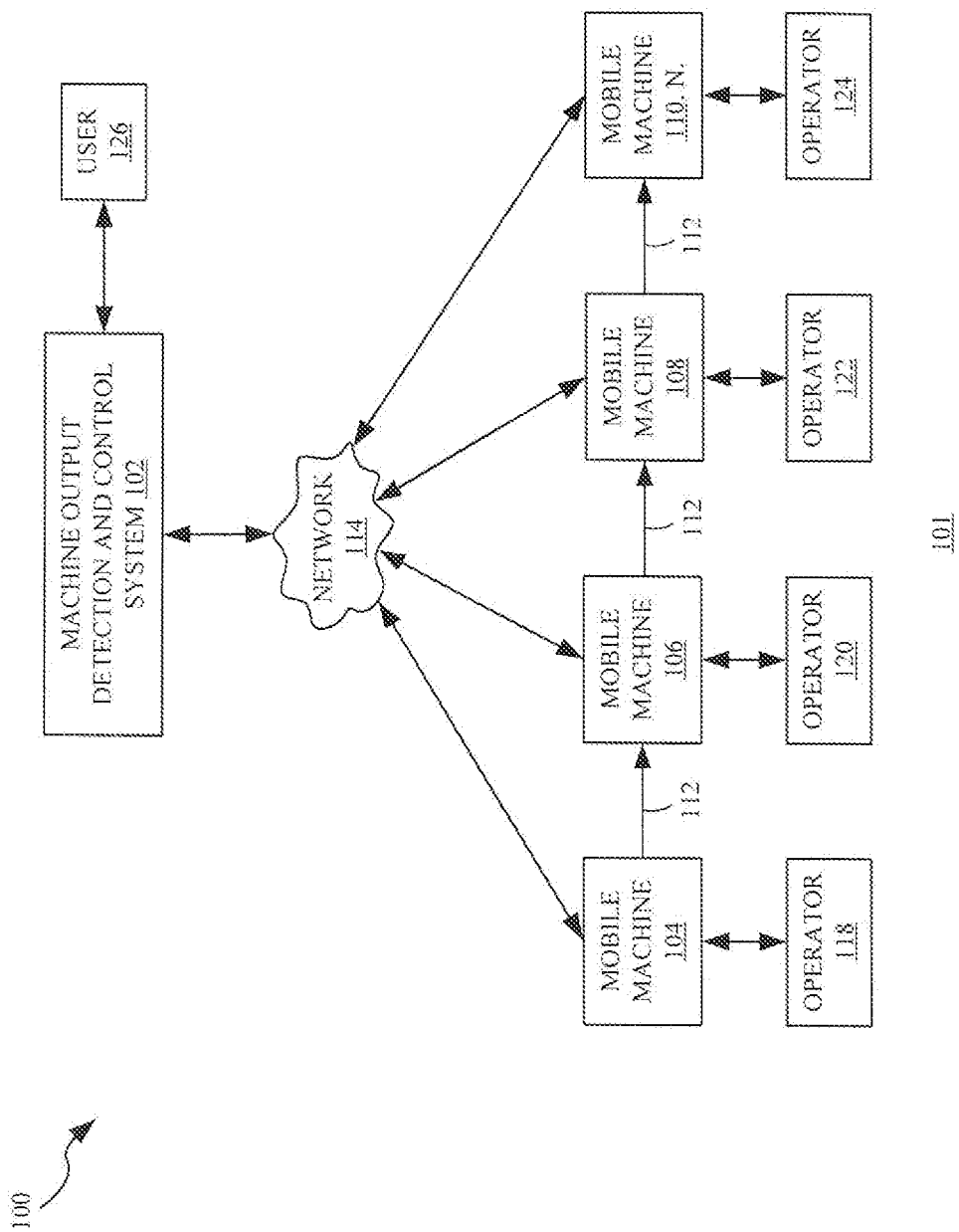
FIG. 1 is a pictorial illustration of a jobsite using a machine output detection and control system.

A wide variety of different forestry operations can be performed at a jobsite. Some example forestry operations include harvesting a planted material, cutting the stems of the harvested material, removing the branches from the harvested material, sorting the harvested material into piles, and loading the piles onto trucks for hauling. Many such forestry operations utilize machinery that can perform a variety of functions.

Forestry machines (also referred to herein as a machine, a mobile machine, and a vehicle) often have a wide variety of sensors that sense a variety of different variables such as machine operating parameters, worksite characteristics, environmental parameters, etc. Sensor signals are communicated over a controller area network (CAN) bus (or another network, such as an Ethernet network, WiFi, etc.) to various systems on the machine that process the sensed variables to generate output signals (such as control signals or other outputs) based on the sensed variables.

These sensor signals are communicated to provide information, such as a measured length of a tree that is harvested by a machine. However, this sensor information is often used within the context of the sensing machine, itself. Because each machine can use sensors and scales of measurement that are particular to that machine, the information obtained across a jobsite can vary from one machine to another. In addition, each machine might obtain sensor information that is specific to the current operation being performed by that machine. For instance, a feller buncher might generate sensor signals indicating a length of a cut stem, while a skidder might generate sensor signals indicating a weight of a load. The information that is particular to each machine might be provided to an operator on the respective machine. However, there is generally a lack of understanding of how this information can be used to measure and control machine performance across the entire jobsite. For instance, this machine-specific information can be used to control machines to improve jobsite performance if it is expressed according to variables that are consistent for measuring machine productivity across the worksite.

To address at least some of these difficulties, the present description provides a machine output detection and control system. As will be discussed in further detail below, the machine output detection and control system translates machine-specific information into tangible measures of output, taking into consideration the widely varying characteristics of machines and operators. It calculates a normalized measure of performance, normalized across the various machines, to accurately measure the output of the entire jobsite for a given time period. The machine output detection and control system uses the accurately measured performance information to generate action signals. The action signals can be used to automatically or semi-automatically control the machines to improve overall jobsite performance by, for example, automatically controlling machine subsystems, providing operator assistance features, and generating user interfaces that visually represent measured performance information.

FIG. 1 is a pictorial illustration of an architecture 100 including a machine output detection and machine output detection and control system 102. FIG. 1 illustratively shows that one or more mobile machines 104, 106, 108, and 110 operate to perform one or more forestry operations at a jobsite 101. Each mobile machine 104-110 can be a different mobile machine that performs forestry operations particular to that machine. Mobile machines 104-110 illustratively operate at jobsite 101 according to a machine dependency order (represented by arrows 112) that defines an order in which the machines perform their respective operations. That is, machine 106 operates on the logs after they are operated on by machine 104. Machine 108 operates on the logs after they are operated on by machine 106, etc. Machine dependency order 112 therefore provides a collective workflow of operation across all machines 104-110 operating at jobsite 101.

As an example only, and not by limitation, mobile machine 104 can be a harvester that harvests trees from jobsite 101, mobile machine 106 is a skidder that collects and transports the harvested trees to an area at jobsite 101, mobile machine 108 is a swing machine that sorts the harvested trees into piles, and mobile machine 110 is a knuckleboom loader that loads the sorted piles. In machine dependency order 112, skidder 106 is illustratively shown as a mobile machine that is dependent on harvester 104. That is, skidder 106 depends on harvester 104 providing the harvested trees for skidder 106 to collect and transport. Subsequently, swing machine 108 is dependent on skidder 106 to provide the harvested trees for sorting. As such, if a particular one of mobile machines 104-110 is performing poorly, that machine's poor performance can impact the ability of the downstream machines to perform their respective operations. For example, if mobile machine 104 is processing a load (some amount of material) too slowly, the downstream machines 106-110 might experience downtime while waiting for the load to reach their stage in machine dependency order 112. In such an example, the poor performance of mobile machine 104 limits the ability of other mobile machines 106-110 to operate at a desired level of performance. Thus, where performance of machines 104-110 can be understood in a normalized fashion, each machine can be evaluated and control signals can be generated to control each machine to improve the performance of each machine, and thereby improve performance of the collective operation having machine dependency order 112.

Figure 2:
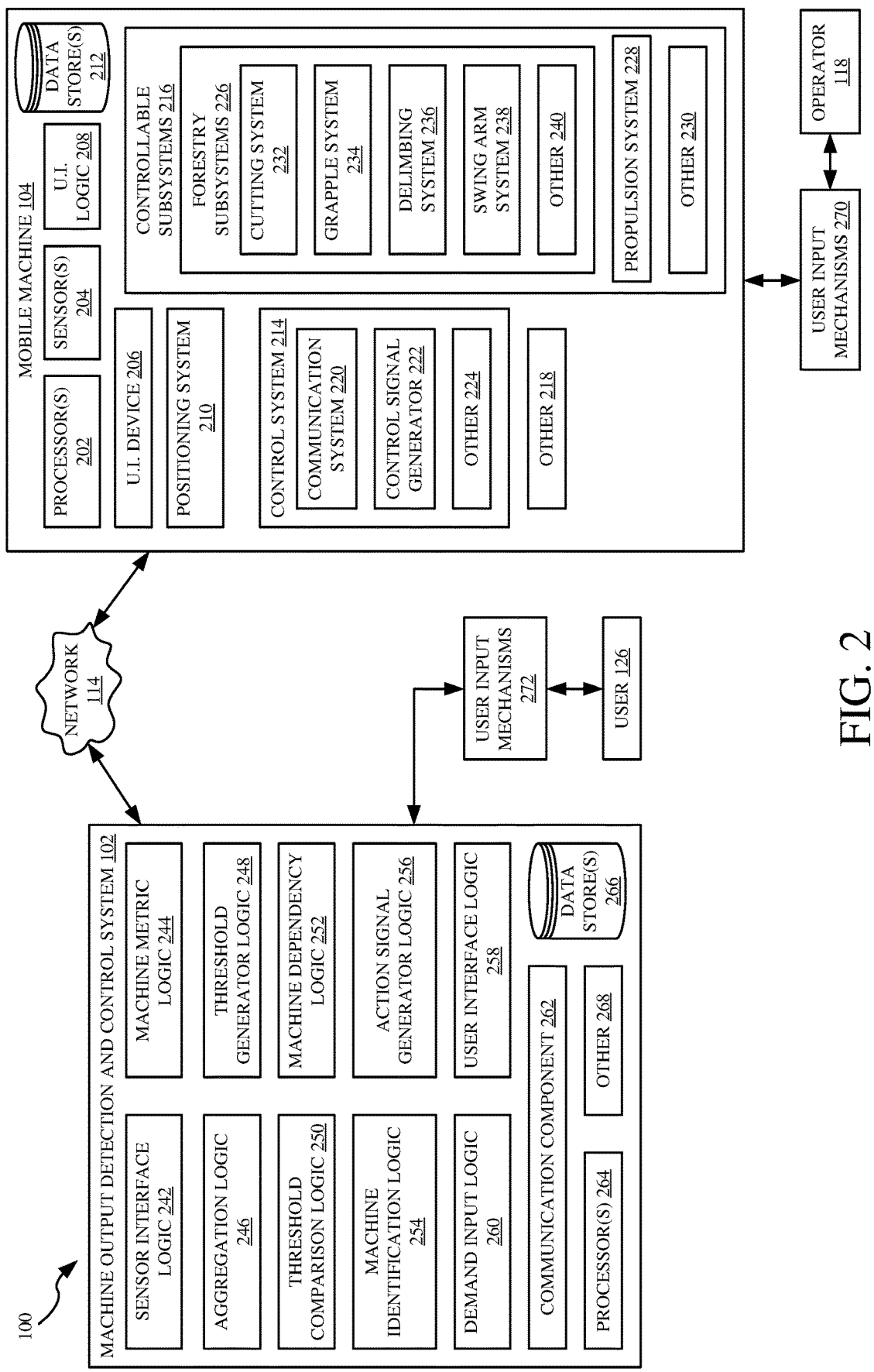
FIG. 2 is a block diagram of one example of a computing architecture that includes the machine output detection and control system illustrated in FIG. 1.

FIG. 2 is a block diagram of one example of a portion of architecture 100 that includes machine output detection and control system 102 and mobile machine 104 illustrated in FIG. 1. Prior to discussing machine output detection and control system 102 in detail, an overview of computing architecture 100 and mobile machine 104 is first provided.

As mentioned, FIG. 2 illustratively shows machine output detection and control system 102 and mobile machine 104 connected over network 114. Thus, computing architecture 100 operates in a networked environment, where network 114 includes any of a wide variety of different logical connections such as a local area network (LAN), wide area network (WAN), near field communication network, satellite communication network, cellular networks, or a wide variety of networks or combination of networks.

While the present description will primarily focus on an example in which mobile machine 104 includes a forestry machine that performs forestry operations, it is noted that mobile machine 104 can include any of a wide variety of different machines. In addition, while the present description will primarily focus on an example of machine output detection and control system 102 communicating with mobile machine 104, it is noted that the same or similar functionality can be provided when communicating with a wide variety of other mobile machines and/or remote systems.

FIG. 2 illustratively shows that mobile machine 104 includes one or more processor(s) 202, one or more sensor(s) 204, user interface device 206, user interface logic 208, positioning system 210, one or more data store(s) 212, control system 214, controllable subsystems 216, and other mobile machine components 218.

In one example, mobile machine 104 uses user interface logic 208 to generate operator interface displays having user input mechanisms 270 for display output on a user interface device 206 and for interaction by operator 118. Operator 118 can be a local operator of mobile machine 104 in an operator's compartment of mobile machine 104, and can interact with user input mechanisms 270 to control and manipulate mobile machine 104. Operator 118 can also be a remote operator of mobile machine 104, interacting with mobile machine 104, for example, via a communication device over network 114. User input mechanisms 270 can include one or more display devices (e.g., user interface device 206), one or more audio devices, one or more haptic devices, and other items, such as a steering wheel, joysticks, pedals, levers, buttons, keypads, etc.

Sensor(s) 204 can generate a wide variety of different sensor signals representing a wide variety of different sensed variables. For instance, sensor(s) 204 generate signals indicative of stem length, stem diameter, stem weight, load weight, acceleration, hydraulic actuator movement or position, a geographic location (e.g., where sensors 204 include a global positioning system (GPS) receiver or other positioning system 210), among others. Sensor(s) 204 can also include imaging sensors, such as video cameras, laser, LIDAR, radar, and a wide variety of other imaging systems.

Positioning system 210 illustratively generates one or more signals indicative of a position of mobile machine 104 at any given time during an operation. Generally, positioning system 210 receives sensor signals from one or more sensor(s) 204, such as a GPS receiver, a dead reckoning system, a LORAN system, or a wide variety of other systems or sensors, to determine a position of mobile machine 104 across jobsite 101. Positioning system 210 can also access data store 212 to retrieve stored positioning information that indicates positions of mobile machine 104 in performing historical operations, as well as the paths and/or patterns of travel of mobile machine 104 during performance of the historical operations.

Control system 214 illustratively includes communication system 220, which is generally configured to allow mobile machine 104 to communicate with remote systems including other mobile machines 106-110, and machine output detection and control system 102, among others. Thus, communication system 220 illustratively communicates over communication networks discussed above. It also illustratively allows portions of machine 104 to communicate with one another, such as over a controller area network (CAN) bus. Control system 214 also includes control signal generator 222 that generates control signals for controlling a variety of different controllable subsystems 216 based on sensor signals generated by sensor(s) 204, based on information received through communication system 220 (e.g., information received from machine output detection and control system 102), based on user inputs received through user input mechanisms 270 detected via user interface logic 208, based on positioning information obtained from positioning system 210, and/or it can generate control signals in a wide variety of other ways as well. Control system 214 can include other control system components 224 as well. Controllable subsystems 216 illustratively include forestry subsystems 226 and propulsion system 228, among a wide variety of other controllable subsystems 230. Propulsion system 228 generally includes an engine that drives ground engaging wheels or tracks via a powertrain mechanism. Forestry subsystems 226 illustratively include cutting system 232, grapple system 234, delimbing system 235, and swing arm system 238, among a wide variety of other forestry subsystems 239.

Machine output detection and control system 102 illustratively includes sensor interface logic 242, machine metric logic 244, aggregation logic 246, threshold generator logic 248, threshold comparison logic 250, machine dependency logic 252, machine identification logic 254, action signal generator logic 256, user interface logic 258, demand input logic 260, communication component 262, one or more processor(s) 264, and one or more data store(s) 266, among a wide variety of other machine output detection and control components 268.

Communication component 262 is generally configured to facilitate communication between machine output detection and control system 102 and a wide variety of remote systems including mobile machines 104-110, among others. Thus, communication component 262 illustratively communicates over communication networks discussed above.

In one example, machine output detection and control system 102 uses user interface logic 258 to generate interface displays having user input mechanisms 272 for display output on a user interface device for interaction by user 126. Machine output detection and control system 102 can also or alternatively use user interface logic 258 to generate interface displays having user input mechanisms 270 for display output on user interface device 206, and for interaction by operator 118. As such, information generated by machine output detection and control system 102 can be provided as tangible performance and control data to both a site manager (e.g., user 126) and to a machine operator (e.g., operator 118). User interface logic 258 also detects user inputs through, or interaction with, user input mechanisms 272, which can take a wide variety of different forms, some of which are described below. User interface logic 258 can send an indication of the detected user interaction to other items in machine output detection and control system 102, to machines 104-110, or elsewhere.

Sensor interface logic 242 obtains sensor signals from a wide variety of different sensors on a wide variety of different mobile machines 104-110. Sensor interface logic 242 uses indications of the sensed signals to generate a set of sensor information that identifies which variables were sensed by which of machines 104-110. In the example illustrated in FIG. 2, sensor interface logic 242 generally detects indications of signals sensed by sensor(s) 204. Sensor information generated by sensor interface logic 242 can include, for example, material characteristics (such as size, weight, length, volume of logs, etc.), engine speed or other engine characteristics or variables, utilization of a machine implement (e.g., a saw, knife, grapple), an indication of a machine operation being performed (e.g., pick up, drop, delimb, sort, load, etc.), among others.

Machine metric logic 244 generates quantity metrics that indicate measured variables, indicative of, or characterizing, an operation performed by mobile machine 104. That is, quantity metrics generated by machine metric logic 244 represent a measured variable that is specific to mobile machine 104 and sensor(s) 204. Each machine 104-110 at jobsite 101 might use different sensors or have different measurement calibrations of the same or similar sensors. Machine metric logic 244 is therefore configured to generate quantity metrics that are specific to the variables being sensed by sensors on that particular machine. A plurality of different quantity metrics can be provided by machine metric logic 244, where each quantity metric is provided according to the variables that are sensed or otherwise measured for a particular operation being performed at one of mobile machines 104-110.

In the example where mobile machine 104 is a harvester, machine metric logic 244 can use sensor signals obtained by sensor interface logic 242 to generate quantity metrics indicating measured lengths of stems cut by mobile machine 104. Where mobile machine 106 is a skidder, for example, machine metric logic 244 can generate quantity metrics representing a diameter of stems, as sensed by sensors specific to mobile machine 106. Examples of quantity metrics generated by machine metric logic 244 include measured characteristics of the material being processed, such as a calculated average stem length, average diameter, average weight, number of stems in a bundle, number of bundles moved, etc. Machine metric logic 244 can also generate quantity metrics that include a time parameter. For instance, machine metric logic 244 can generate a quantity metric that defines an amount of time that machine 104 operates (the uptime) to harvest a number of stems. It can generate a metric indicating how long it takes skidder 106 to move a bundle of logs (or an average time per bundle, an average time per volume of logs, etc.).

Aggregation logic 246 aggregates the plurality of different quantity metrics to generate, for each mobile machine, a normalized production unit that is normalized across the plurality of different mobile machines. A normalized production unit generated by aggregation logic 246 generally represents a measured output of mobile machine 104 (e.g., the machine-specific quantity metric for mobile machine 104) in a normalized fashion. That is, where the measured variable for mobile machine 104 may initially be expressed in machine-specific measurements, such as a number of stems cut per hour, aggregation logic 246 translates the measured variable according to parameters that are defined for tracking performance across mobile machines 104-110. In one example, normalization parameters include a volume of material processed per unit of time. That is, the stems cut per hour, by mobile machine 104, is aggregated by aggregation logic 246 into a measured number of minutes to process a particular volume of stems that fills a single hauling truck. As will be discussed in further detail below, aggregation logic 246 can generate the normalized production units on a per-cycle basis, thereby generating a measurable output for each machine and each machine cycle. Aggregation logic 246 can define a cycle time as an amount of time that a particular mobile machine operates to output a defined measure of material. For instance, a cycle can be defined as an amount of time that a mobile machine operates to process a defined volume of stems (where that volume fills a single truck). In one example, aggregation logic 246 is configured to identify the measure of material, output by the particular mobile machine during the cycle time, as an amount of material that is to be output in order to meet the threshold measure of material. These are examples only.

Normalized production units, generated by aggregation logic 246, are used to measure performance, and control operation of, mobile machines 104-110 across a plurality of cycles in a given work period. To measure performance at a jobsite level, for jobsite 101, the normalized production units can be compared to a benchmark or threshold production unit. Machine output detection and control system 102 can determine a benchmark or threshold production unit according to information that represents a demand for the entire jobsite 101.

Demand input logic 260 is configured to receive an indication of a demand input. The indication of the demand input can be obtained through a user input (e.g., detected by user interface logic 258 through user input mechanisms 272), from a remote system, and in a wide variety of other ways. Based on the indication of the demand input, demand input logic 260 defines a target amount of material to be processed at jobsite 101 and a total cycle time available for processing the target amount of material at jobsite 101. For example, demand input logic 260 can define a target of 420 tons of material to be processed, across mobile machines 104-110, in 435 minutes of available time. Of course, this is just an example, and demand input logic 260 can identify a wide variety of other demands for jobsite 101.

Threshold generator logic 248 generates a threshold production unit by defining a threshold measure of material and a corresponding threshold cycle time. The threshold production unit generated by threshold generator logic 248 can be defined according to the same parameters as those specified for the normalized production unit. For instance, where a normalized production unit defines an amount of time that mobile machine 104 operates to process a volume of material (e.g., minutes per ton or tons per minute of logs), threshold generator logic 248 can define the threshold production unit according to a threshold measure of time to process a threshold volume of material (e.g., minutes per ton or tons per minute of logs). To generate the threshold production unit, threshold generator logic 248 can access demand information generated by demand input logic 260. Threshold generator logic 248 uses demand information, for the entire jobsite 101, to define performance targets on a machine-level. In the example where a jobsite demand is defined by demand input logic 260 to include a jobsite 101 target of 420 tons to be processed in 435 minutes (e.g., in a work shift), threshold generator logic 248 generates individual performance targets for each machine 104-110. That is, threshold generator logic 248 can determine that a truck hauls a maximum volume of 28 tons, and so 15 trucks are required to meet the target of 420 tons, and each truck must therefore be filled in 29 minutes. Accordingly, threshold generator logic 248 generates a threshold production unit indicating a target performance for each machine, where each machine is to process one truck's worth of material (28 tons) in 29 minutes. If the machines all do this, they will meet the target performance for the jobsite.

Threshold comparison logic 250 compares the normalized production unit, for the mobile machine, to the threshold production unit generated by threshold generator logic 248. Threshold comparison logic 250 then generates a comparison output signal based on the comparison. Threshold comparison logic 250 determines whether the cycle time, of each mobile machine, needed to output the amount of material that meets the threshold measure of material, meets the threshold cycle time. If the cycle time of a particular mobile machine does not meet the threshold cycle time, then threshold comparison logic 250 generates a comparison output signal indicating that the particular mobile machine will not perform to output at least the threshold production unit (28 tons in 29 minutes). On the other hand, if the cycle time of the particular mobile machine does meet (e.g., is equal to, or less than) the threshold cycle time, then threshold comparison logic 250 generates a comparison output signal indicating that the particular mobile machine is performing to meet the threshold production unit. Threshold comparison logic 250 can also compare the cycle time of the particular mobile machine to the threshold cycle time while considering a tolerance, such as a threshold amount of deviation from the threshold production unit, itself. For instance, it can consider whether the actual production unit is within several minutes of time above or below the threshold cycle time, thereby allowing the comparison output signal to be generated while accounting for small errors in measurements.

Machine identification logic 254 automatically identifies a particular one of mobile machines 104-110 (or it can identify more than one machine 104-110), based on the determination that the cycle time of the particular mobile machine does not meet the threshold cycle time. Machine identification logic 254 generates a machine identifier signal indicative of the particular mobile machine identified. In one example, machine identification logic 254 automatically identifies the particular mobile machine as a mobile machine that corresponds to a bottleneck in machine dependency order 112.

Machine dependency logic 252 defines an order in which mobile machines 104-110 operate on a set of material at jobsite 101. For instance, it defines the machine dependency order illustratively shown in FIG. 1 at arrows 112. As discussed above, machine dependency order 112 identifies a dependency chain for jobsite 101, where at least some of mobile machines 104-110 are dependent on the performance of other preceding mobile machines in the order.

Machine dependency logic 252 also determines whether performance of a particular mobile machine is limiting an ability of other mobile machines to operate on the set of material to meet a performance standard (i.e., whether it is acting as a bottleneck). Machine dependency logic 252 receives the machine identifier signal from machine identification logic 254, and identifies the particular mobile machine as a limiting machine that limits an ability of the other mobile machines downstream in machine dependency order 112. Machine dependency logic 252 can thus identify the particular mobile machine as corresponding to a bottleneck in performance at jobsite 101, where the bottleneck indicates a limit on a collective ability of machines 104-110 to meet the jobsite demand. That is, machine dependency logic 252 determines that mobile machines downstream in order 112, from the particular mobile machine, will be limited by the poor performance of the particular mobile machine (as identified by machine identification logic 254 according to comparisons of normalized production units to normalized threshold production units). Machine dependency logic 252 generates a dependency signal indicative of the identified mobile machine corresponding to bottleneck on performance across jobsite 101.

Action signal generator logic 256 generates an action signal, based on signals output by any or all of sensor interface logic 242, machine metric logic 244, aggregation logic 246, threshold generator logic 248, threshold comparison logic 250, machine dependency logic 252, machine identification logic 254, demand input logic 260, user interface logic 258, among a wide variety of other signals or information. Action signal generator logic 256 generates action signals that are configured to automatically or semi-automatically control mobile machine 104, such as an action signal that controls one or more controllable subsystems 216. Action signal generator logic 256 can also generate action signals that provide indications of performance analysis on a representation of a user interface display (e.g., on user interface devices 206).

Action signals generated by action signal generator logic 256 can indicate a measured performance of a particular machine, identify a particular machine in machine dependency order 112, such as a machine that corresponds to a bottleneck on performance at jobsite 101 (user display signal to display an indication of the limiting machine on a user interface display), indicate a corrective action for operating mobile machine 104 or for controlling a wide variety operator assistance features, among others. In one example, action signal generator logic 256 generates an indication of a bottleneck that identifies, on a user interface that visually represents machine dependency order 112, a particular one of the mobile machines corresponding to the bottleneck. As another example, action signal generator logic 256 generates instructions that control one or more controllable subsystems, on a particular one of the mobile machines, to improve performance of the particular one of the mobile machines operating according to a given cycle.

Figure 2A:
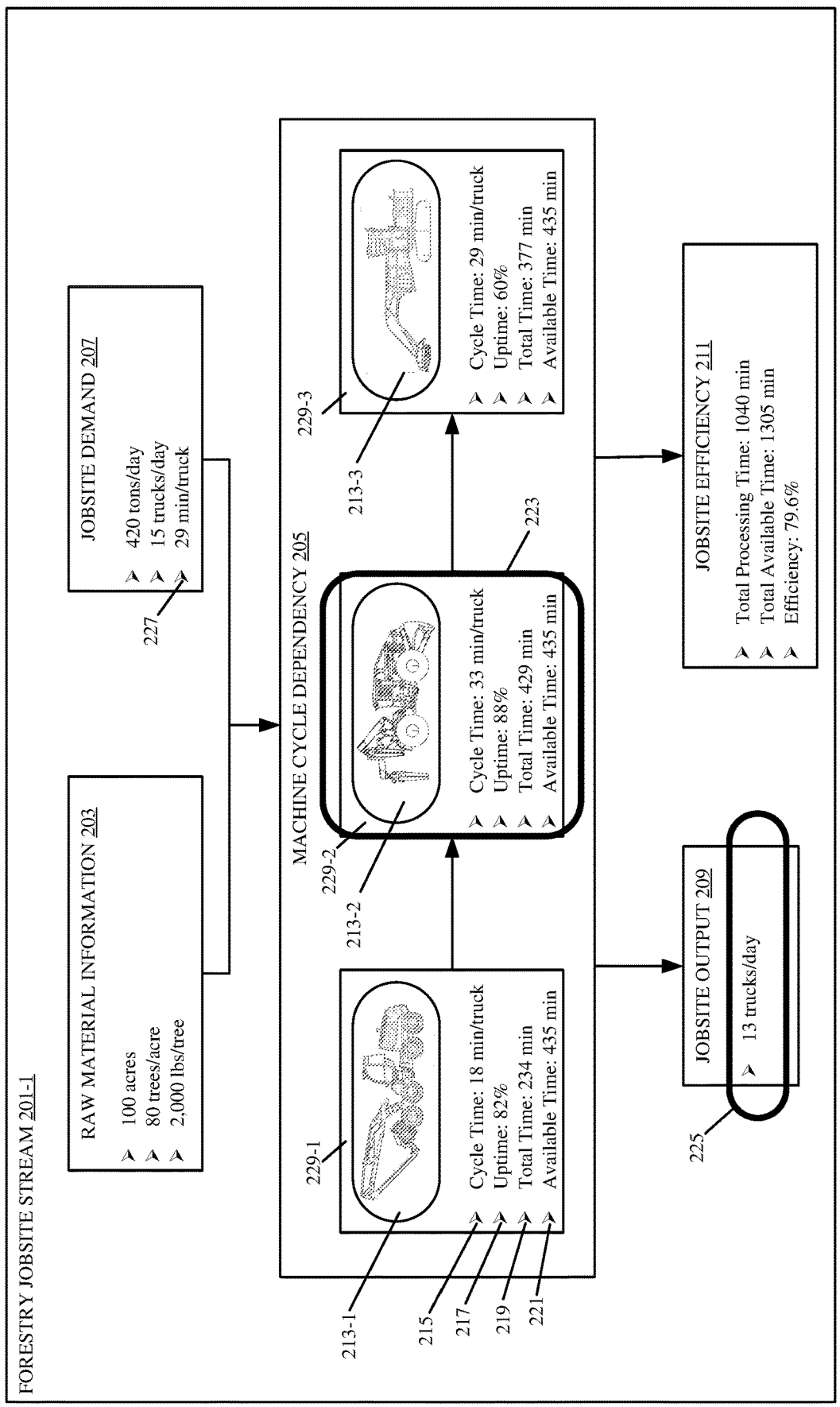
FIGS. 2A and 2B are exemplary jobsite performance stream user interface displays.

FIG. 2A illustrates one example of a forestry jobsite stream user interface 201-1 that displays indications of action signals generated by action signal generator logic 256. User interface 201-1 illustratively includes a visual representation of raw material information 203, such as a number of acres, a number of trees per acre, an average weight per tree, other characteristics indicative of a set of material to be processed at jobsite 101, and/or a wide variety of other information such as a geographical map of jobsite 101. User interface 201-1 also includes a visual representation of a jobsite demand 207, such as a total number of tons to be processed, which is also illustratively shown as a number of trucks worth of material. The demand for each machine cycle time is illustratively represented at reference numeral 227, illustratively shown as a threshold cycle time of 29 minutes per truck.

To provide a visual understanding of performance on a set of material, across the different machines, user interface 201-1 displays a visual representation 205 of an order of machine dependency for processing the set of material. Each machine (e.g., machine 104, machine 106, and machine 108) is identified in dependency visual representation 205 by a machine identifier 213. That is, identifiers 213-1, 213-2, and 213-3, respectively, identify machine 104, machine 106 and machine 108. Machine identifiers 213 can include an image or a name of the machine, or a wide variety of other indications that identify the particular machine. The indications of action signals, representing measured performance of the machines, are illustratively displayed according to processing stage identifiers 229-1, 229-2, and 229-3. That is, as an example, machine 104 is illustratively identified with machine identifier 213-1 at processing stage 229-1, machine 106 is identified with machine identifier 213-2 at processing stage 229-2, etc. As such, interface 201-1 provides a visual representation of the dependency chain for the entire jobsite workflow.

Each machine identified on interface 201-1 is displayed with indications of action signals including a measured cycle time 215, a measured uptime 217, a total machine processing time 219, and an available machine processing time 221, each set of indications being specific to measurements and signals generated for the particular machine at that particular stage. Visual indication 223 is displayed to indicate to a user that a measured cycle time for the corresponding machine (e.g., machine 106 at processing stage 229-2) does not meet the threshold cycle time. For instance, visual indication 223 indicates that machine 106 is a limiting machine, as discussed above. In the illustrated example, visual indication 223 indicates that machine 106, operating at processing stage 229-2, has a cycle time of 33 minutes per truck. In addition, visual indication 225 is displayed on interface 201-1 to indicate that the actual jobsite output, shown at reference numeral 209, is only 13 trucks per day, which is not sufficient to meet the jobsite demand of 15 trucks per day. It is noted that visual indications 223 and 225 can include a wide variety of different visual indications such as, but not limited to, colored boxes, blinking or flashing indicators, highlighting, icon or dialog displays, etc. Indications 223 and 225 can also be generated with corresponding haptic feedback provided any of user input mechanisms 270 and 272, as well as a wide variety of other operator assistance features. In addition, jobsite efficiency 211 is illustratively shown on user interface 201-1 to indicate a total jobsite processing time, a total time available for the jobsite, and a measured jobsite efficiency across all machines (e.g., 79.6% efficiency).

Therefore, the example shown in FIG. 2A includes forestry jobsite user interface 201-1 using generated action signals to notify an operator that a particular machine (e.g., machine 106) is underperforming relative to the jobsite demand. To improve performance, a different machine can be used to decrease the amount of time spent to process a single truck's worth of trees at processing stage 229-2 (e.g., to decrease cycle time of a machine operating at a stage that is underperforming).

Figure 2B:
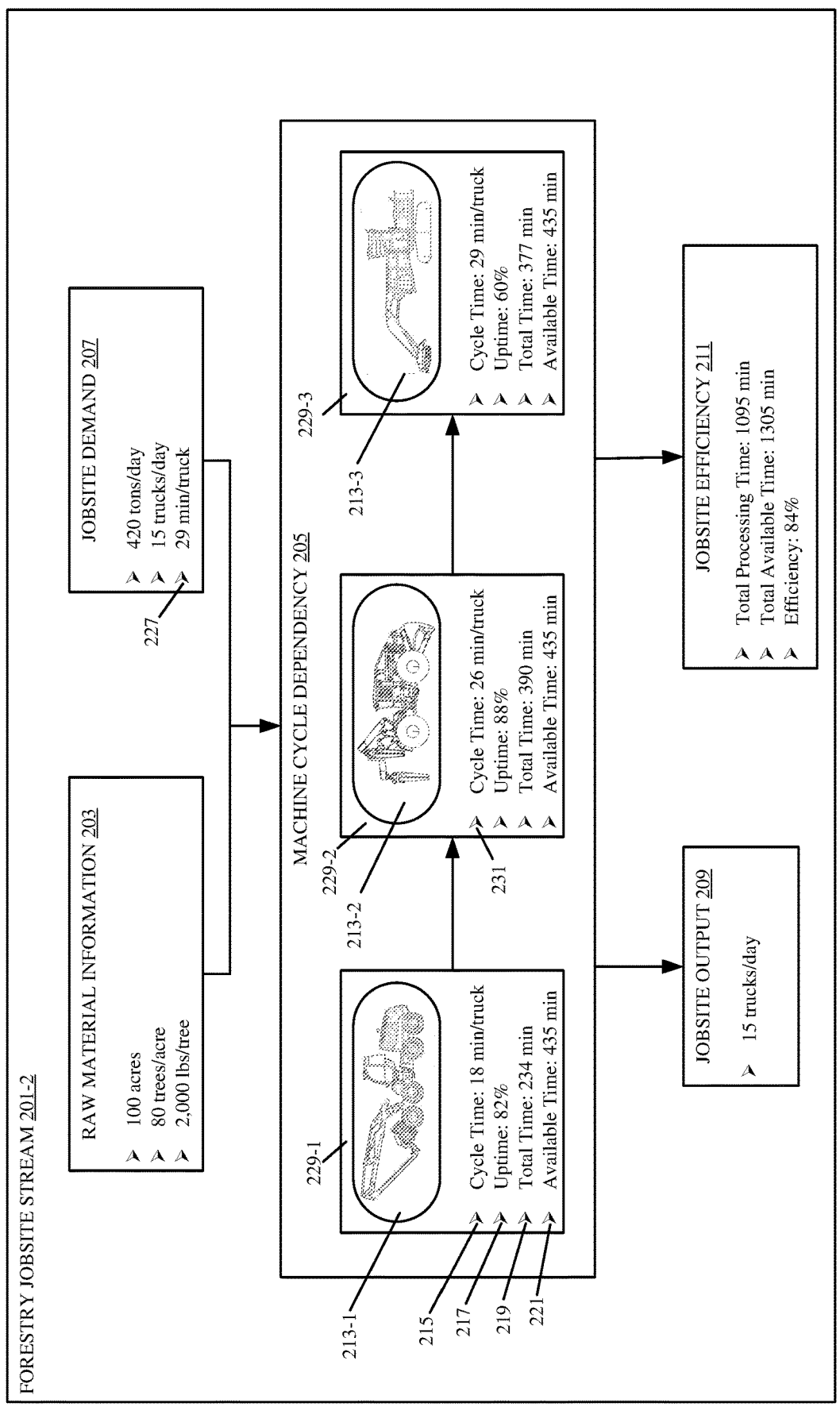

FIG. 2B illustrates another example of a forestry jobsite stream user interface 201-2 that displays indications of action signals, generated by action signal generator logic 256. Forestry jobsite stream user interface 201-2 includes many of the features discussed above with respect to FIG. 2A and interface 201-1. However, interface 201-2 represents an example where a limiting machine has been identified and replaced by a more efficient machine (e.g., a larger machine). As such, interface 201-2 does not include a visual indication (e.g., visual indicators 223 and 225 shown in FIG. 2A) of a machine that has been identified as a limiting machine that limits the collective performance of the machines across the jobsite. Instead, interface 201-2 shows that machine performance, corresponding to processing stage 229-2, has been improved by displaying a visual indication 231 of a new cycle time, indicating 26 minutes per truck. Accordingly, because the machine utilized at processing stage 229-2 performs to meet the threshold cycle time, interface 201-2 shows that performance has been improved across the worksite. For instance, interface 201-2 is generated to include action signals that represent a determination that the collective output (shown at reference numeral 209) now meets the jobsite demand (shown at reference numeral 207), and therefore that the jobsite efficiency (shown at reference numeral 211) has improved to 84% (relative to the 79.6% jobsite efficiency measured with the example situation shown in FIG. 2A).

Figure 3:
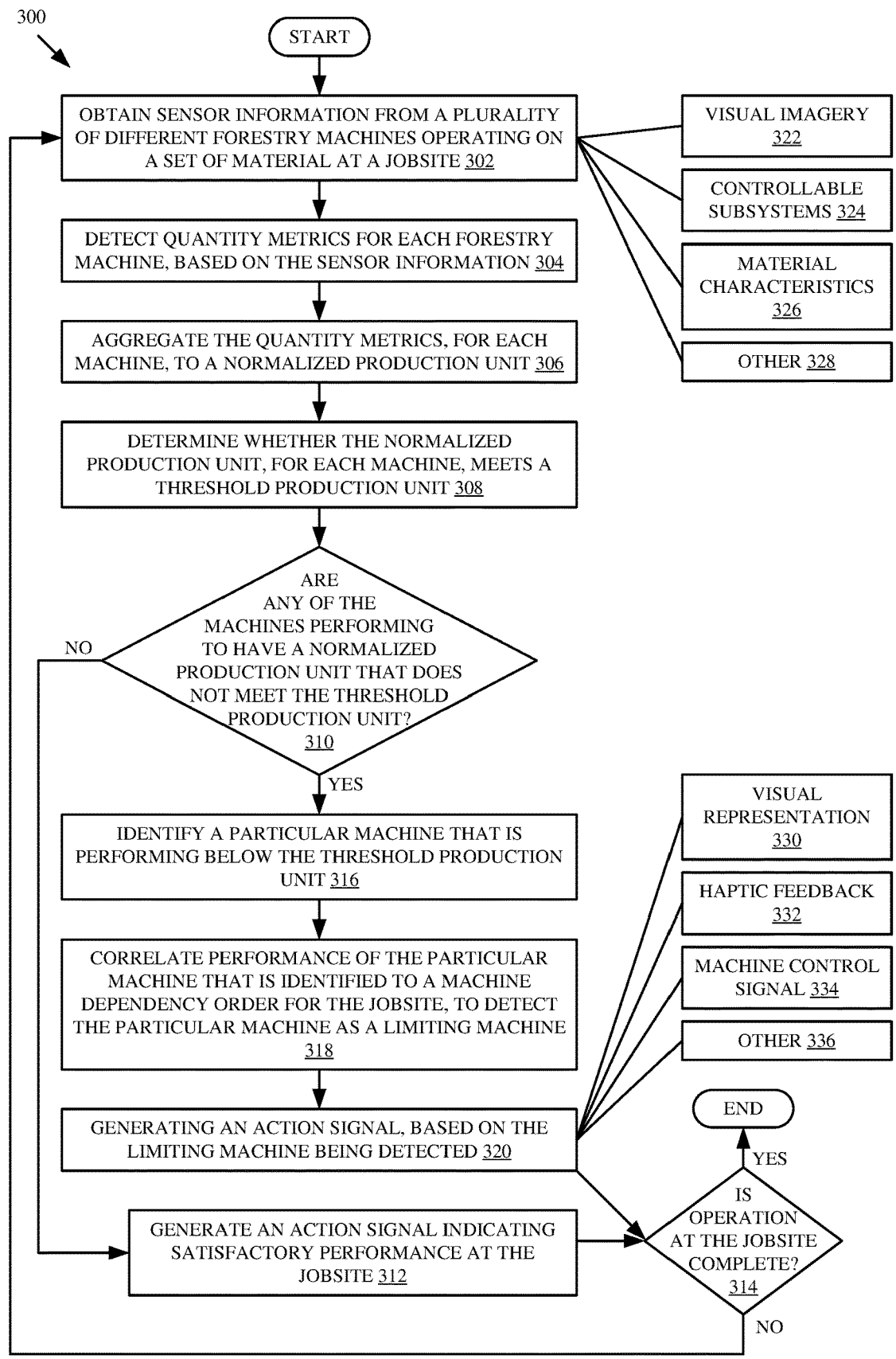
FIG. 3 illustrates a flow diagram showing one example of performing a machine output detection and control analysis to control a machine.

FIG. 3 illustrates a flow diagram showing one example of performing a machine output detection and control operation 300 to control a machine.

At block 302, sensor interface logic 242 obtains sensor information from mobile machines 104-110 operating at a jobsite (e.g., from sensor(s) 204). The sensor information can include visual imagery information, as indicated at block 324, sensor information associated with controllable subsystems as indicated at block 326, sensed characteristics of a material being processed as indicated at block 326, and a wide variety of other sensor information indicated at block 330.

At block 304, machine metric logic 244 detects a plurality of different quantity metrics associated with each of mobile machines 104-110. Machine metric logic 244 can generate quantity metrics, for each machine, based on the sensor information obtained at block 302, and/or based on a wide variety of other information. In one example, quantity metrics detected at block 304 include raw measurements of processed material such as a measured weight, diameter, length, or volume, etc.

At block 306, aggregation logic 246 aggregates the plurality of different quantity metrics, for each machine, to a normalized production unit. Accordingly, block 306 includes aggregation logic 246 defining parameters for a normalized production unit, and translating machine-specific information (expressed as quantity and time metrics) into production units that are measured consistently across mobile machines 104-110, as discussed above with respect to FIG. 2. In one example, block 306 includes defining a volume of material processed, per unit time, by each machine 104-110.

At block 308, threshold comparison logic 250 determines whether the normalized production unit, generated for each machine, meets a threshold production unit. Accordingly, block 308 includes obtaining a threshold production unit, generated by threshold generator logic 248, and comparing the threshold production unit to each production unit that is normalized for each machine. In one example, a threshold production unit defines a threshold amount of material to be processed by a given mobile machine in a threshold cycle time.

At decision block 310, machine identification logic 254 determines if any of the individual machines have a normalized production unit that does not meet the threshold production unit, based on the comparison shown at block 308. If at block 310 machine identification logic does 254 not identify a machine that has a normalized production unit that does not meet the threshold production unit, then operation 300 illustratively continues at block 316. At block 316, action signal generator logic 256 generates an action signal indicating performance across jobsite 101 is satisfactory. For instance, the action signal generated at block 316 indicates that performance of each machine, across jobsite 101, meets a threshold level of performance to thereby collectively meet a jobsite demand. However, if at block 310 machine identification logic 254 identifies a machine that has a normalized production unit that does not meet the threshold production unit, then operation 300 illustratively continues at block 316.

At block 316, machine identification logic 254 identifies the machine having a normalized production unit that does not meet the threshold production unit. As such, block 316 includes machine identification logic 254 generating a machine identifier that identifies a particular one of machines 104-110 that is performing below a desired level of performance, relative to the jobsite demand.

At bock 318, machine dependency logic 252 correlates the normalized production unit, generated for each machine, to a machine dependency order for jobsite 101 (e.g., order 112 shown in FIG. 1). For instance, block 308 includes machine dependency logic 252 defining a machine dependency order, as discussed above. Machine dependency logic 252 uses the defined machine dependency order to determine that the particular machine, identified at block 316, is a limiting machine that limits an ability of other machines, downstream from the identified machine in the order, to process the set of material. As such, block 320 illustratively includes identifying a bottleneck on an ability of the collective jobsite 101 to meet a jobsite demand. Machine dependency logic 252 outputs a signal indicating the bottleneck being identified as corresponding to the particular machine, based on the information indicating a comparison of individual machine performance (normalized production unit) to target machine performance (a threshold production unit).

At block 320, action signal generator logic 256 generates an action signal indicative of the bottleneck identified in accordance with block 318. As indicated at block 330, the action signal generated by action signal generator logic 256 can include controlling a display device to generate a visual representation, such as a user interface displayed on user interface device 206. The action signal can include a control signal that controls haptic feedback on user input mechanisms 270. The action signal can include a machine control signal that controls communication component 262 to send instructions that instruct control signal generator 222, on mobile machine 104, to output control signals for controlling a portion of mobile machine 104, as similarly discussed above. Action signal generator logic 256 can generate a wide variety of other action signals 336 as well, such as controlling communication component 262 to send the signals to other systems, machines, etc.

At block 314, sensor interface logic 242 determines whether a jobsite operation is finished. If not, processing returns to obtaining sensor information at block 302. If the jobsite operation is determined to be finished, operation 300 illustratively ends.

Figure 4:
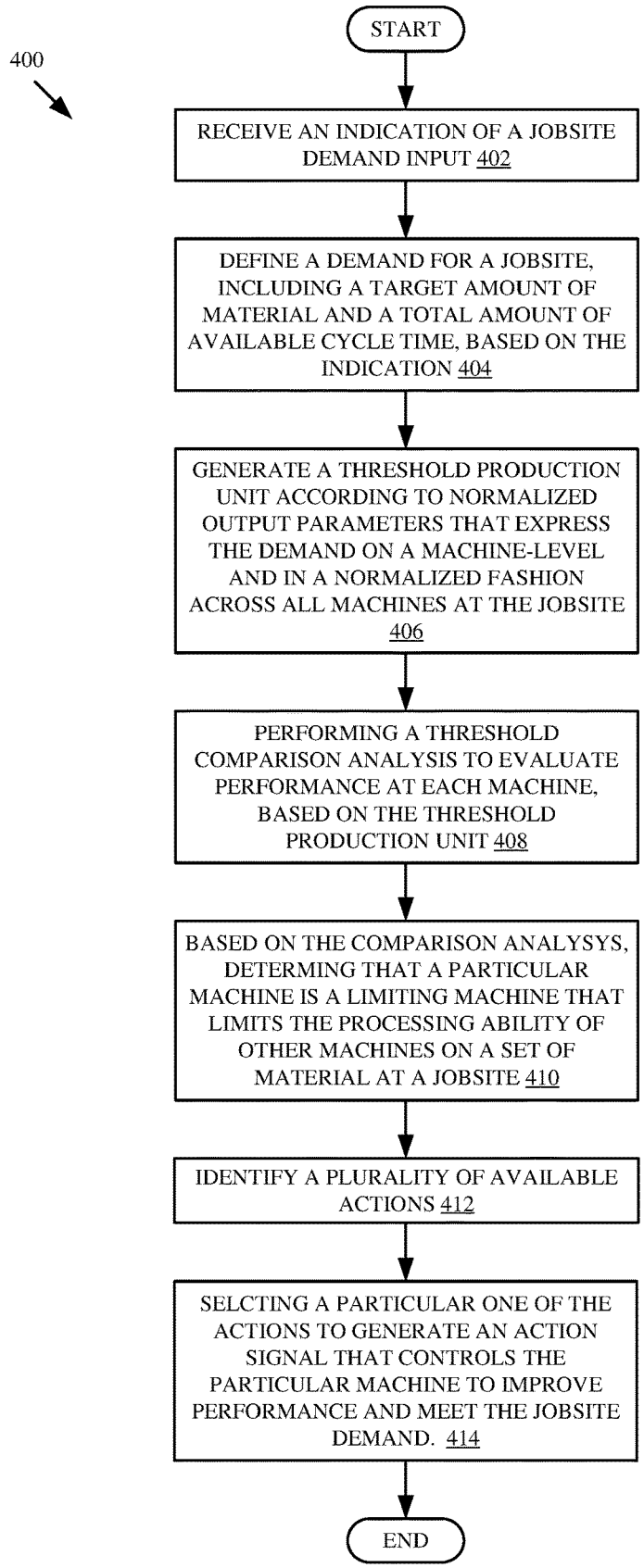
FIG. 4 illustrates a flow diagram showing one example of determining a jobsite demand to implement an action that controls a machine.

FIG. 4 illustrates a flow diagram showing one example operation 400 of determining a jobsite demand to implement an action that controls a machine. At block 402, demand input logic 260 receives an indication of a jobsite demand input. In one example, the indication of the jobsite demand input includes an indication of a user input provided through user input mechanisms 272. Of course, the indication of the jobsite demand can be received in a wide variety of other ways as well.

At block 404, demand input logic 260 defines a demand for jobsite 101, based on the indication of the jobsite demand input. Demand input logic 260 defines the demand including a target amount of material, to be processed collectively across machines 104-110, and a total amount of cycle time available for mobile machines 104-110 to process the material at jobsite 101. For example, demand input logic 260 defines a jobsite demand including a target of 420 tons of material to be processed within 435 minutes of available time (e.g., within one working shift of 7.25 hours).

At block 406, threshold generator logic 248 generates a threshold production unit according to normalized output parameters, based on the jobsite demand. Accordingly, at block 406, threshold generator logic 248 breaks down the jobsite demand (e.g., collective volume/total cycle time available) to defines an amount of material to be processed, by each machine, within a cycle time. For example, the threshold production unit generated at block 406 determines that each machine must perform to process 28 tons in 29 minutes for each cycle, and that each machine must complete 15 total cycles to meet the entire jobsite demand.

At block 408, threshold comparison logic 250 performs a comparison that compares, for each machine, the normalized production unit, representing actual performance of the machine, to the threshold production unit. Block 408 further includes determining whether the actual performance of the machine meets or exceeds the desired demand for the machine, based on the comparison.

At block 410, machine dependency logic 252 determines that a particular one of the mobile machines is a limiting machine that limits an ability of the other mobile machines, downstream of the particular machine in the order, to operate to process material and meet the threshold level of performance. Machine dependency logic 252 determines that a particular one of the machines is a limiting machine based on the comparison of the normalized production unit, for that machine, to the threshold production unit.

At block 412, action signal generator logic 256 identifies a plurality of actions available to implement at jobsite 101 to control mobile machines 104-110 and improve machine performance. Available actions can include actions that automatically or semi-automatically control any of mobile machines 104-110, actions that generate indications for output on a visual display (e.g., user interface device 206), actions that adjust a jobsite demand, actions that redeploy resources (such as actions that control communication component 262 to send a communication to a different operator or a different component operator on a different machine indicating the need for that machine or operator to assist or replace the limiting machine or operator), and a wide variety of other actions.

At block 414, action signal generator logic 256 selects a particular action, and generates an action signal that controls one or more systems and/or mobile machines to improve performance of mobile machines 104-110 operating according to machine dependency order 112. In one example, action signal generator logic 256 selects the particular action, to generate the action signal, based on a degree of severity of the comparison. That is, an action such as an action that controls a mobile machine can be selected if the normalized production unit for that machine deviates from the threshold production unit more than a threshold amount of deviation. A different action, such as an action that provides an output signal for visually representing an indication on a display, can be selected if the normalized production unit for that machine only deviates from the threshold production unit by a small amount, or some amount that is less than a threshold amount of deviation. In other words, block 414 illustratively includes selectively implementing corrective actions that control one or more mobile machines to improve performance of the machines, where the actions are selected based on how severely the performance of the machine deviates from a target performance.

It can thus be seen that the present description defines machine performance across an entire jobsite to control machines and improve machine performance. Performance of individual machines is detected according to the parameters generated by sensing systems on the machines. This machine-specific information is aggregated using aggregation logic, thereby generating a measure of performance that is expressed in consistent terms across each machine operating on a set of material at the jobsite. Threshold comparison logic generates a threshold measure of production for each machine to meet in order to achieve a desired measure of performance for the entire jobsite. The threshold measure of production is also expressed in the consistent terms, and is thereby compared to the normalized production units for each machine. The comparison allows machine dependency logic to identify any particular machine that is not performing well enough, which includes a determination that that machine is limiting other machines from collectively performing to meet the jobsite demand. Accordingly, the system herein defines a bottleneck in an order that machines operate on a set of material across the worksite. This is in contrast to some current systems which monitor machine-specific information and attempt to control machines to improve performance for the entire jobsite, based on uncorrelated machine specific metrics. This can result in the machine being inefficiently utilized for an operation. For instance, some current systems might allocate machine processing power on operations that are believed to be inefficient. However, the operations are only understood to be inefficient within the context of the machine-specific information, and thus the machine itself. Instead, the present system uses aggregation algorithms to define a measure of performance that is normalized across various machines at a jobsite, and normalized relative to a target level of performance, and to control machines based on that measure. This allows operators and jobsite managers to quickly identify a limiting machine, and implement a corrective action that can include automatically generating control signals to control operation of mobile machines to improve performance and efficiency at the jobsite.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
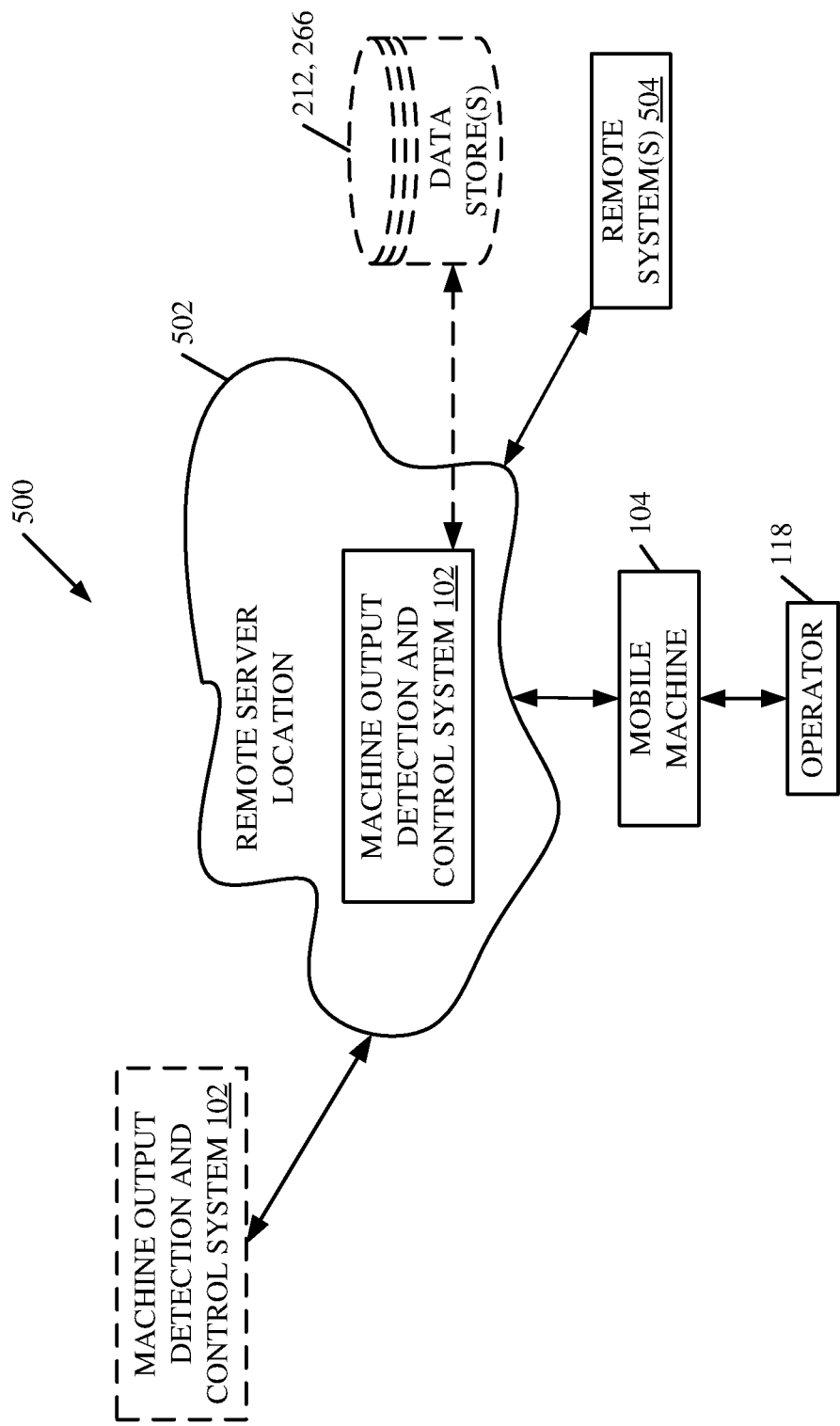
FIG. 5 shows one example of the machine output detection and control system illustrated in previous Figures, deployed in a remote server architecture.

FIG. 5 is a block diagram of architecture 100, shown in FIGS. 1 and 2, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIGS. 1 and 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 5, some items are similar to those shown in FIG. 2 and they are similarly numbered. FIG. 5 specifically shows that machine output detection and control system 102 (or parts of it) can be located at a remote server location 502. Therefore, mobile machine 104 accesses those systems through remote server location 502. FIG. 5 also shows that remote system(s) 504 can be accessed through remote server location 502.

FIG. 5 also depicts another example of a remote server architecture. FIG. 5 shows that it is also contemplated that some elements of FIG. 2 are disposed at remote server location 502 while others are not. By way of example, data stores 212, 266 and machine output detection and control system 102 can be disposed at a location separate from location 502, and accessed through the remote server at location 502. Regardless of where they are located, they can be accessed directly by mobile machine 104, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As mobile machine 104 comes close to the fuel truck for fueling, the system automatically collects the information from mobile machine 104 using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on mobile machine 104 until the mobile machine 104 enters a covered location. Mobile machine 104, itself, can then send the information to the main network.

It will also be noted that the elements of FIG. 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
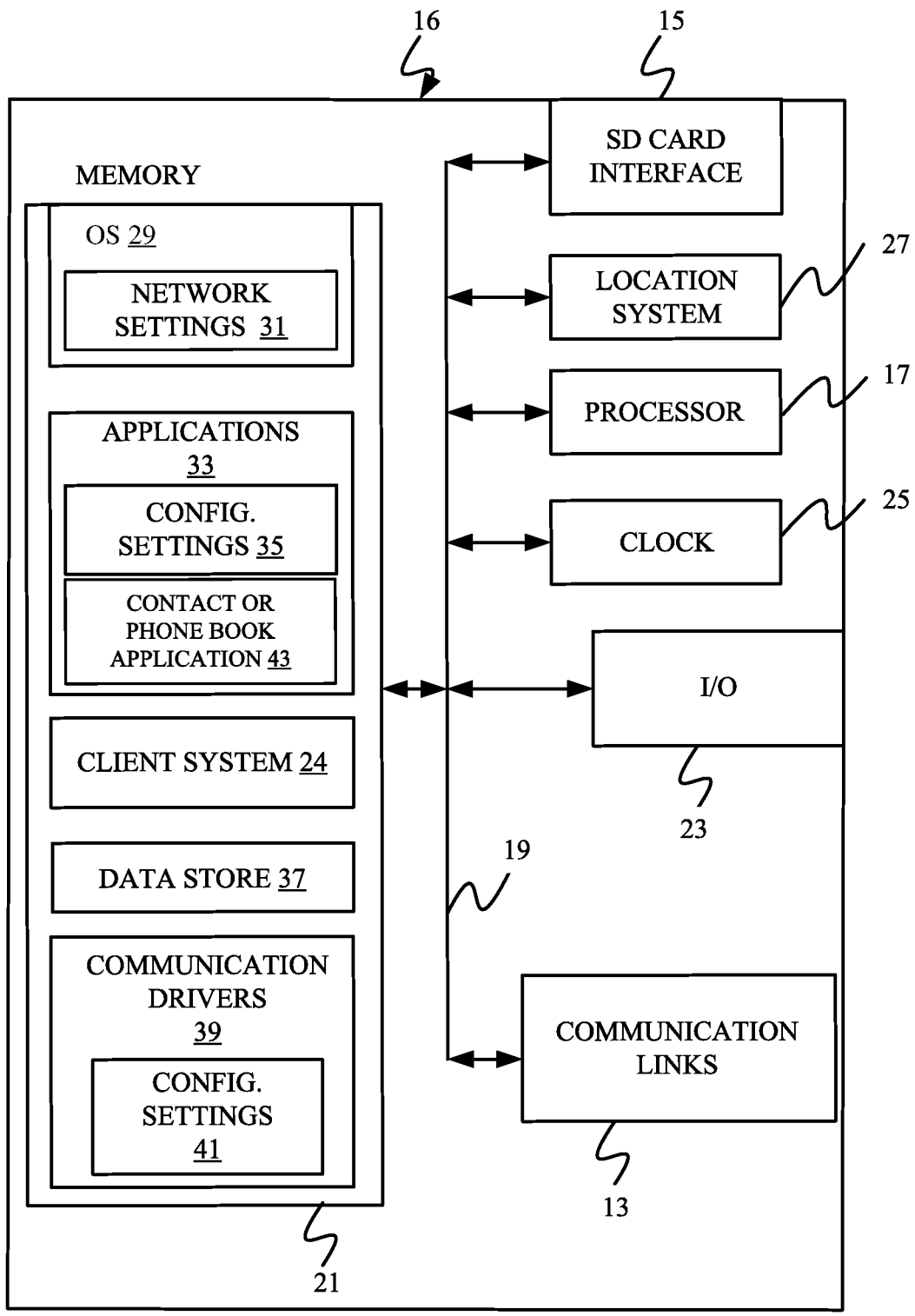
FIG. 6-8 show examples of mobile devices that can be used in the architectures shown in the previous figures.
Figure 7:
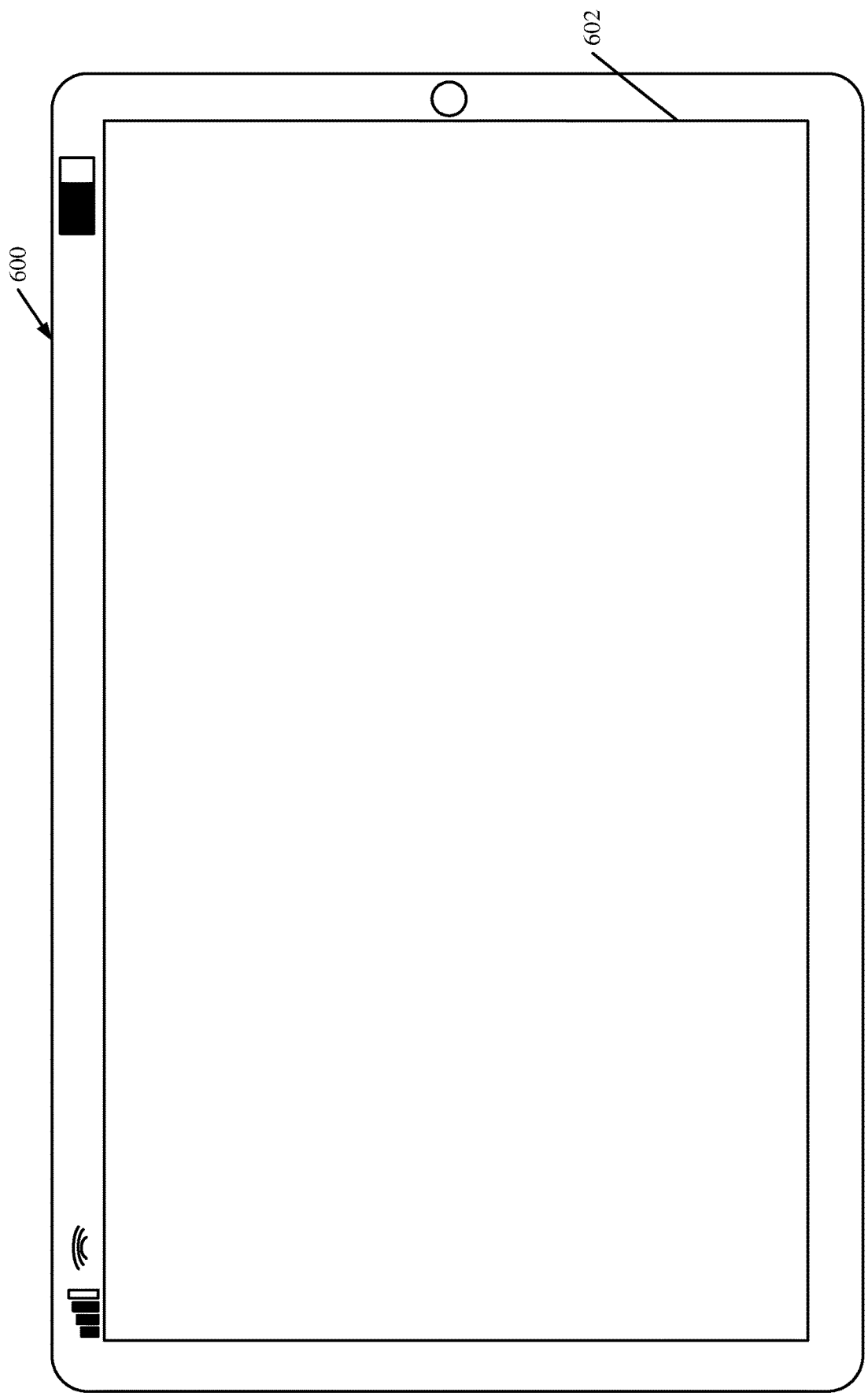
Figure 8:
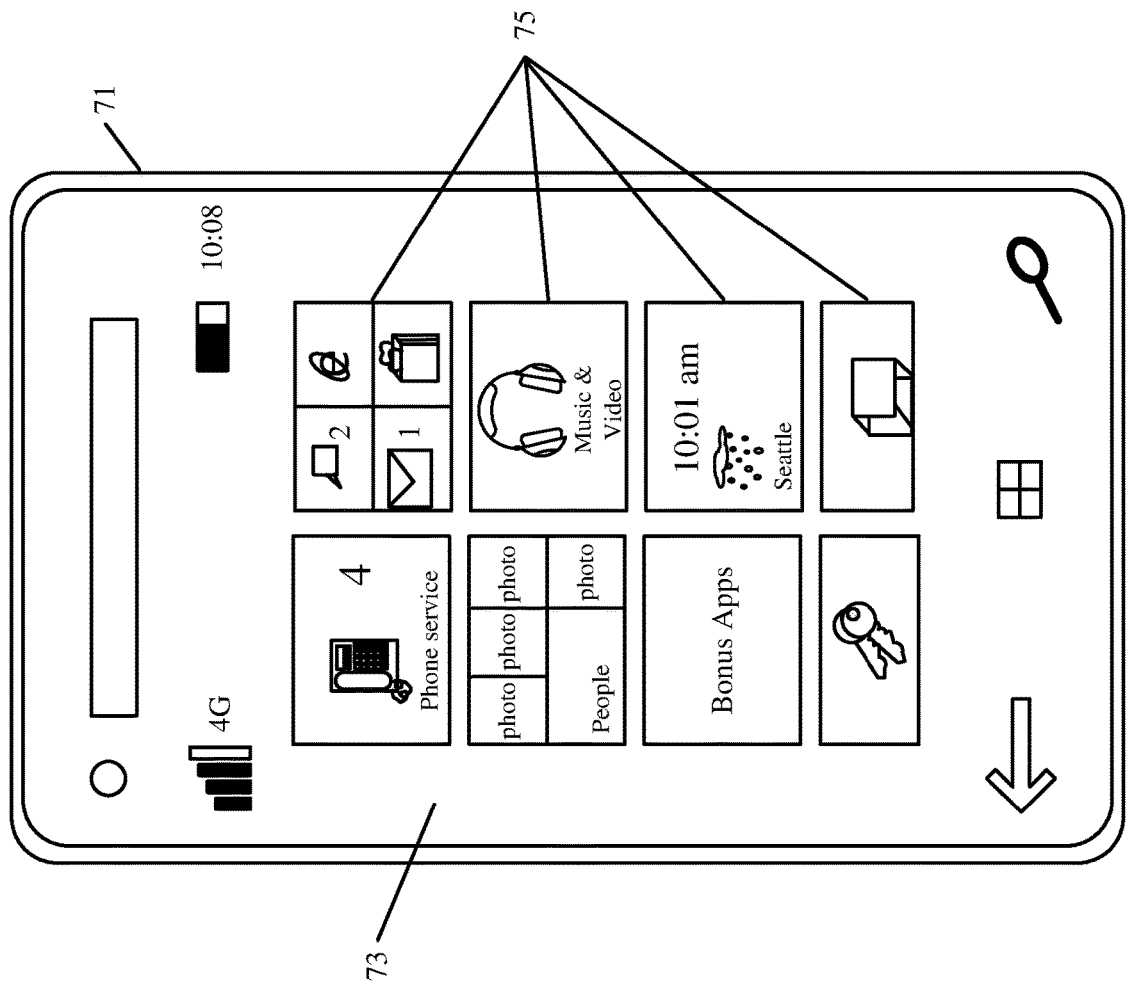

FIG. 6 is a simplified block diagram of one illustrative example of a handheld or mobile computing device that can be used as a user's or client's hand held device 16, in which the present system (or parts of it) can be deployed. For instance, a mobile device can be deployed in the operator compartment of mobile machine 104 for use in generating, processing, or displaying the information and user interfaces discussed above. FIGS. 7-8 are examples of handheld or mobile devices.

FIG. 6 provides a general block diagram of the components of a client device 16 that can run some components shown in FIG. 2, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous Figures) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 7 shows one example in which device 16 is a tablet computer 600. In FIG. 7, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 9:
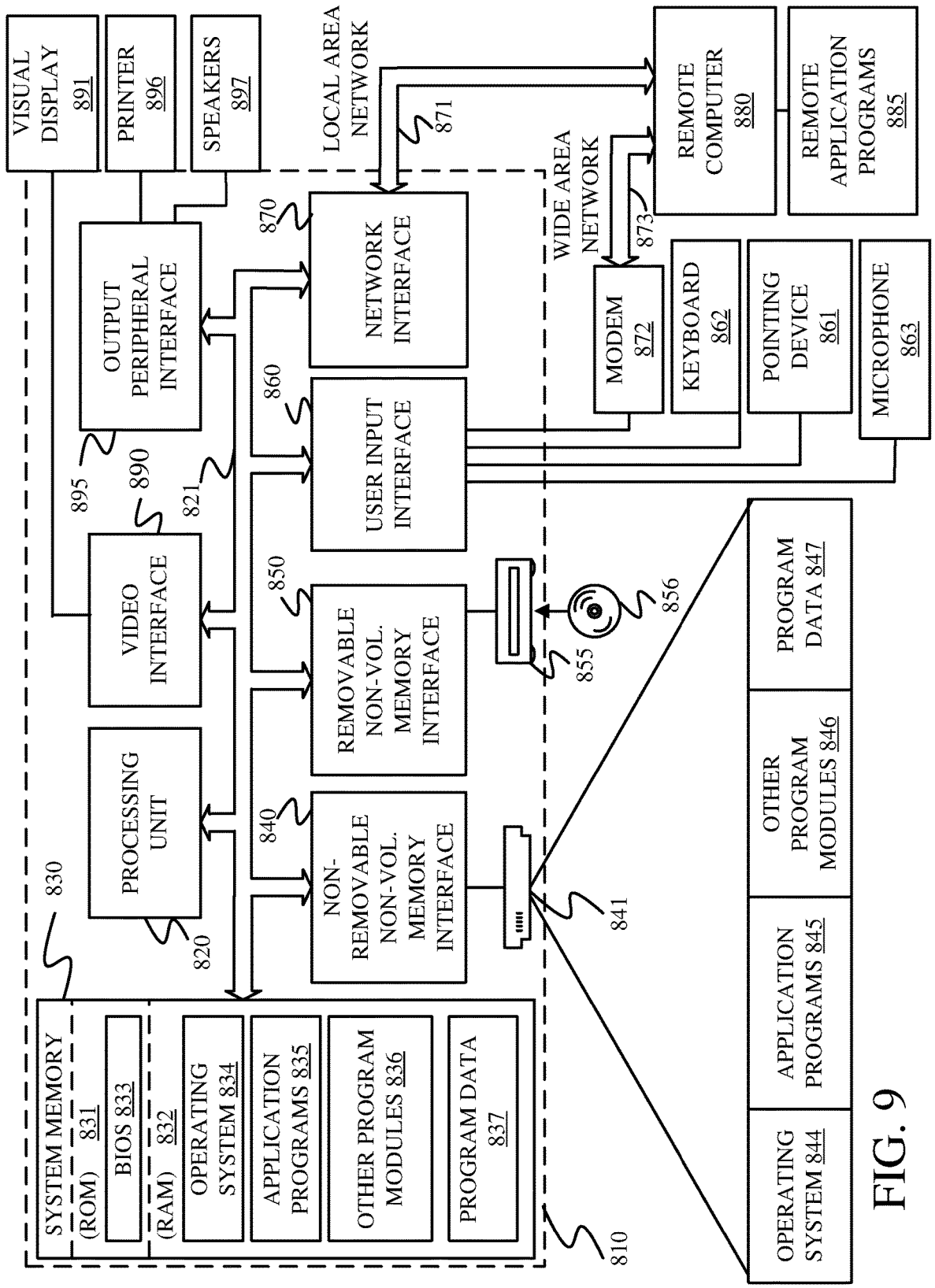
FIG. 9 is a block diagram showing one example of a computing environment that can be used in the architectures shown in the previous figures.

FIG. 9 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

FIG. 9 is one example of a computing environment in which elements of FIG. 2, or parts of it, (for example) can be deployed. With reference to FIG. 9, an example system for implementing some embodiments includes a general-purpose computing device in the form of a computer 810. Components of computer 810 may include, but are not limited to, a processing unit 820 (which can comprise processors or servers from previous Figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous Figures can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball, levers, knobs, buttons, switches, pedals, steering wheel, or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880. The items can connect over a controller area network (CAN) with a suitable CAN bus.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 9 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a machine output detection and control system, comprising:
 machine metric logic that detects a plurality of quantity metrics, each quantity metric corresponding to sensor information associated with at least one mobile machine in a plurality of different mobile machines;
 aggregation logic that aggregates the plurality of different quantity metrics to generate, for each mobile machine, a normalized production unit that is normalized across the plurality of different mobile machines;
 machine dependency logic that correlates the normalized production unit, for each mobile machine, to a machine dependency that identifies an order in which the plurality of different mobile machines operate on a set of material at a jobsite; and action signal logic that generates an action signal, based on the correlation.

Example 2 is the machine output detection and control system of any or all previous examples, wherein the aggregation logic is configured to detect an uptime, for each mobile machine, and based on the detected uptime, define a cycle time that a particular mobile machine operates to output a measure of material.

Example 3 is the machine output detection and control system of any or all previous examples, wherein the action signal logic is configured to generate an indication of a bottleneck that identifies, on a user interface that visually represents the order, a particular one of the mobile machines corresponding to the bottleneck.

Example 4 is the machine output detection and control system of any or all previous examples, wherein the action signal logic is configured to generate instructions that control one or more controllable subsystems, on a particular one of the mobile machines, to improve performance of the particular one of the mobile machines operating according to a given cycle.

Example 5 is the machine output detection and control system of any or all previous examples, further comprising:
 threshold logic configured to define a threshold production unit including a threshold measure of material and a threshold cycle time.

Example 6 is the machine output detection and control system of any or all previous examples, wherein the threshold logic comprises:
 comparison logic configured to compare the normalized production unit, for the particular mobile machine, to the threshold production unit, and generate a comparison output signal based on the comparison.

Example 7 is the machine output detection and control system of any or all previous examples, wherein the aggregation logic is configured to identify the measure of material, output by the particular mobile machine during the cycle time, as an amount of material that is to be output in order to meet the threshold measure of material.

Example 8 is the machine output detection and control system of any or all previous examples, wherein the comparison logic is configured to determine that the cycle time, of the particular mobile machine, needed to output the amount of material that meets the threshold measure of material does not meet the threshold cycle time, and wherein the action signal logic further comprises:
 control signal generator logic configured, based on the determination, to perform a control operation that controls the particular mobile machine.

Example 9 is the machine output detection and control system of any or all previous examples, further comprising:
 machine identification logic configured to automatically identify the particular mobile machine, based on the determination that the cycle time of the particular mobile machine does not meet the threshold cycle time, and generate a machine identifier signal indicative of the particular mobile machine identified.

Example 10 is the machine output detection and control system of any or all previous examples, wherein the machine dependency logic is configured to receive the machine identifier signal and identify the particular mobile machine as a limiting machine that limits an ability of the other mobile machines, that are downstream from the particular mobile machine in the order, to meet the threshold measure of material and the threshold cycle time, and wherein the action signal logic is configured to generate, as the action signal, a user display signal to display an indication of the limiting machine on a user interface display.

Example 11 is the machine output detection and control system of any or all previous examples, further comprising:
 demand input logic configured to receive an indication of a demand and define a target amount of material to be processed at a jobsite and a total cycle time available for processing the target amount of material at the job site, based on the indication of the demand; and
 wherein the threshold logic is configured to generate the threshold measure of material based on the target amount of material for the jobsite, and generate the threshold cycle time based on the total cycle time available for the jobsite.

Example 12 is a computer-implemented method comprising:
 detecting a plurality of quantity metrics corresponding to sensor information associated with a plurality of different mobile machines;
 aggregating the plurality of different quantity metrics to a normalized production unit that is normalized across the plurality of different mobile machines;
 correlating the normalized production unit, for each mobile machine, to a machine dependency that identifies an order in which the plurality of different mobile machines perform an operation on a set of material; and
 generating an action signal, based on the correlation.

Example 13 is the computer-implemented method of any or all previous examples, wherein aggregating the plurality of different quantity metrics to a normalized production unit, comprises:
 defining, for a particular one of the mobile machines, the normalized production unit including a cycle time used by the particular mobile machine to output a measure of material.

Example 14 is the computer-implemented method of any or all previous examples, further comprising:
 detecting a threshold input defining a threshold production unit including a threshold measure of material and a threshold cycle time.

Example 15 is the computer-implemented method of any or all previous examples, wherein correlating the normalized production unit, for each mobile machine, to the machine dependency order comprises:

comparing the normalized production unit, for the particular mobile machine, to the threshold production unit; and generating a comparison signal based on the comparison.

Example 16 is the computer-implemented method of any or all previous examples, wherein comparing the normalized production unit to the threshold production unit comprises:

measuring the cycle time as an amount time that the particular mobile machine operates to output the measure of material that meets the threshold measure of material; and determining whether the cycle time meets the threshold cycle time, the comparison signal being indicative of whether the cycle time meets the threshold cycle time.

Example 17 is the computer-implemented method of any or all previous examples, wherein generating an action signal comprises:

automatically generating an indication of a bottleneck in the machine dependency, based on a determination that the cycle time, of the particular mobile machine, does not meet the threshold cycle time; and generating the action signal to identify the particular mobile machine as a limiting machine limiting an ability of the other mobile machines, downstream from the particular mobile machine in the order, to output the threshold measure of material within the threshold cycle time.

Example 18 is a machine control system, comprising:

machine metric logic that detects a plurality of quantity metrics, each quantity metric corresponding to sensor information associated with at least one of a plurality of different mobile machines at a jobsite;

aggregation logic that aggregates the plurality of different quantity metrics to generate, for each mobile machine, a normalized production unit that is normalized across the plurality of different mobile machines;

machine dependency logic that correlates the normalized production unit, for each mobile machine, to a machine dependency that identifies a machine order in which the plurality of different mobile machines perform an operation on a set of material;

machine identification logic that identifies a particular mobile machine, of the plurality of different mobile machines in the machine order, based on a determination that the normalized production unit for the particular mobile machine does not meet a threshold production unit; and action signal logic that generates an action signal, based on the particular mobile machine being identified and the machine order.

Example 19 is the machine control system of any or all previous examples, wherein the aggregation logic is configured to generate the normalized production unit, for the particular mobile machine, as an indication of a measured amount of material processed by the particular mobile machine during a machine cycle having a defined cycle time, and generate a unit signal indicative of the normalized production unit for the particular mobile machine.

Example 20 is the machine control system of any or all previous examples, further comprising:

threshold logic that defines a threshold amount of material and a threshold cycle time, based on an indication of a jobsite demand, and wherein the machine identification logic is configured to identify a machine cycle time needed to process the threshold amount of material, and identify the particular mobile machine as a bottleneck that limits material output by the plurality of different mobile machines operating on the set of material in the machine order.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A machine output detection and control system, comprising:

machine metric logic that generates a first machine specific quantity metric corresponding to sensor information associated with a first mobile machine and a second machine specific quantity metric corresponding to sensor information associated with a second mobile machine, the first machine specific quantity metric indicating a production of the first mobile machine and the second machine specific quantity metrics indicating a production of the second mobile machine, wherein the first machine specific quantity metric and the second machine specific quantity metric are different;

aggregation logic that aggregates the first machine specific quantity metric and the second machine specific quantity metric to generate, a first normalized production unit corresponding to the first mobile machine and a second normalized production unit corresponding to the second mobile machine, the first normalized production units indicating the production of the first mobile machine and the second normalized production unit indicating the production of the second mobile machine, wherein both the first normalized production unit and the second normalized production units are different than both the first machine specific quantity metric and the second machine specific quantity metric;

machine dependency logic that identifies a machine dependency that defines an order in which the first mobile machine and the second mobile machine operate on a set of material at a jobsite; and action signal logic that generates an action signal, based on the first normalized production unit and the second normalized production unit and the order in which the first mobile machine and the second mobile machine operate on the set of material at the jobsite.

2. The machine output detection and control system of claim 1, wherein the aggregation logic is configured to detect an uptime, for each of the first and second mobile machines, and based on the detected uptime, define a cycle time that a particular mobile machine, of the first mobile machine and the second mobile machine, operate to output a measure of material.

3. The machine output detection and control system of claim 1, wherein the action signal logic is configured to generate an indication of a bottleneck that identifies, on a user interface that visually represents the order in which the first mobile machine and the second mobile machine operate on the set of material at the jobsite, a particular mobile machine, of the first mobile machine and the second mobile machine, corresponding to the bottleneck.

4. The machine output detection and control system of claim 1, wherein the action signal logic is configured to generate instructions that control one or more controllable subsystems, on a particular mobile machine, of the first mobile machine and the second mobile machines, to improve performance of the particular mobile machine.

5. The machine output detection and control system of claim 2, further comprising:
    threshold logic configured to define a threshold production unit including a threshold measure of material and a threshold cycle time.

6. The machine output detection and control system of claim 5, wherein the threshold logic comprises:
    comparison logic configured to compare the normalized production unit, for the particular mobile machine, to the threshold production unit, and generate a comparison output signal based on the comparison.

7. The machine output detection and control system of claim 6, wherein the aggregation logic is configured to identify the measure of material, output by the particular mobile machine during the cycle time, as an amount of material that to be output in order to meet the threshold measure of material.

8. The machine output detection and control system of claim 7, wherein the comparison logic is configured to determine that the cycle time, of the particular mobile machine, needed to output the amount of material that meets the threshold measure of material does not meet the threshold cycle time, and further comprising, wherein the action signal logic further comprises:
    control signal generator logic configured, based on the determination, to generate a control signal to perform a control operation that controls the particular mobile machine.

9. The machine output detection and control system of claim 8, further comprising:
    machine identification logic configured to automatically identify the particular mobile machine, based on the determination that the cycle time of the particular mobile machine does not meet the threshold cycle time, and generate a machine identifier signal indicative of the particular mobile machine identified.

10. The machine output detection and control system of claim 9, wherein the machine dependency logic is configured to receive the machine identifier signal and identify the particular mobile machine as a limiting machine that limits an ability of the other mobile machine, that is downstream from the particular mobile machine in the order, to meet the threshold measure of material and the threshold cycle time, and wherein the action signal is configured to generate, as the action signal, a user display signal to display an indication of the limiting machine on a user interlace display.

11. The machine output detection and control system of claim 5, further comprising:
    demand input logic configured to receive an indication of a demand and define a target amount of material to be processed at a jobsite and a total cycle time available for processing the target amount of material at the jobsite, based on the indication of the demand; and
    wherein the threshold logic is configured to generate the threshold measure of material based on the target amount of material for the jobsite, and generate the threshold cycle time based on the total cycle time available for the jobsite.

12. A computer-implemented method, comprising:
    generating a first machine specific quantity metric corresponding to sensor information associated with a first mobile machine and a second machine specific quantity metric corresponding to sensor information associated with a second mobile machine, the first machine specific quantity metric indicating a production of the first mobile machine and the second machine specific quantity metric indicating a production of the second mobile machine, wherein the first machine specific quantity metric and the second machine specific quantity metric are different;
    aggregating the first machine specific quantity metric and the second machine specific quantity metric to generate, a first normalized production unit corresponding to the first mobile machine and a second normalized production unit corresponding to the second mobile machine, the first normalized production units indicating the production of the first mobile machine and the second normalized production unit indicating the production of the second mobile machine, wherein both the first normalized production units and the second normalized production unit are different than both the first machine specific quantity metric and the second machine specific quantity metric;
    identifying a machine dependency that defines an order in which the first and second mobile machines perform an operation on a set of material; and
    generating an action signal, based on the first normalized production units and the second normalized production unit and the order in which the first and second mobile machines perform an operation on the set of material.

13. The computer-implemented method of claim 12, wherein aggregating the first machine specific quantity metric and the second machine specific quantity metric to generate the first normalized production unit and the second normalized production unit, comprises:
    defining, for a particular one of the first and second mobile machines, the normalized production unit including a cycle time used by the particular mobile machine to output a measure of material.

14. The computer-implemented method of claim 13, further comprising:
    detecting a threshold input defining a threshold production unit including a threshold measure of material and a threshold cycle time.

15. The computer-implemented method of claim 14 and further comprising:
    correlating the first normalized production unit and the second normalized production unit to the machine dependency, wherein correlating the first normalized production unit and the second normalized production unit to the machine dependency comprises:
        comparing the normalized production unit, for the particular mobile machine, to the threshold production unit; and
        generating a comparison signal based on the comparison.

16. The computer-implemented method of claim 15, wherein comparing the normalized production unit to the threshold production unit comprises:
    measuring the cycle time as an amount of time that the particular mobile machine operates to output the measure of material that meets the threshold measure of material; and
    determining whether the cycle time meets the threshold cycle time, the comparison signal being indicative of whether the cycle time meets the threshold cycle time.

17. The computer-implemented method of claim 16, wherein generating an action signal comprises:
    automatically generating an indication of a bottleneck in the machine dependency, based on a determination that the cycle time, of the particular mobile machine, does not meet the threshold cycle time; and
    generating the action signal to identify the particular mobile machine as a limiting machine limiting an ability of the other mobile machine, downstream from the particular mobile machine in the order, to output the threshold measure of material within the threshold cycle time.

18. A machine control system, comprising:

machine metric logic that detects a first machine specific quantity metric corresponding to sensor information associated with a first mobile machine and a second machine specific quantity metric corresponding to sensor information associated with a second mobile machine, the first machine specific quantity metrics indicating a production of the first mobile machine and the second machine specific quantity metric indicating a production of the second mobile machine, wherein the first machine specific quantity metric is expressed in a first unit of measurement and the second quantity metric is expressed in a second unit of measurement, wherein the first unit of measurement and the second unit of measurement are different;

aggregation logic that aggregates the first machine specific quantity metric and the second machine specific quantity metric to generate a first normalized production unit corresponding to the first mobile machine and a second normalized production unit corresponding to the second mobile machine, the first normalized production units indicating the production of the first mobile machine and the second normalized production unit indicting the production of the second normalized machine, wherein the first normalized production units and the second normalized production unit are expressed in a third unit of measurement, the third unit of measurement is different than at least one of the first unit of measurement and the second unit of measurement;

machine dependency logic that identifies a machine dependency that defines a machine order in which the first and second mobile machines perform an operation on a set of material;

machine identification logic that identifies a particular mobile machine, of the first mobile machine and the second mobile machine, in the machine order, based on a determination that the normalized production unit for the particular mobile machine does not meet a threshold production unit, the threshold production unit expressed in the third unit of measurement; and action signal logic that generates an action signal, based on the particular mobile machine identified and the machine order.

19. The machine control system of claim 18, wherein the aggregation logic is configured to generate the normalized production unit, for the particular mobile machine, as an indication of a measured amount of material processed by the particular mobile machine during a machine cycle having a defined cycle time, and generate a unit signal indicative of the normalized production unit for the particular mobile machine.

20. The machine control system of claim 19, further comprising:

threshold logic that defines a threshold amount of material and a threshold cycle time, based on an indication of a jobsite demand, and wherein the machine identification logic is configured to identify a machine cycle time needed to process the threshold amount of material, and identify the particular mobile machine as a bottleneck that limits material output by the other mobile machine operating on the set of material in the machine order.

* * * * *